United States Patent [19]

Hagen et al.

[11] Patent Number: 4,644,141
[45] Date of Patent: Feb. 17, 1987

[54] INFRARED RADIATOR

[75] Inventors: Werner Hagen, Bad Schwartau; Johannes Lagois, Lübeck; Dieter Pruss, Hamburg, all of Fed. Rep. of Germany

[73] Assignee: Drägerwerk AG, Fed. Rep. of Germany

[21] Appl. No.: 784,516

[22] Filed: Oct. 4, 1985

[30] Foreign Application Priority Data

Oct. 12, 1984 [DE] Fed. Rep. of Germany ....... 3437397

[51] Int. Cl.$^4$ .......................... H05B 3/16; H05B 3/10; H01C 1/012
[52] U.S. Cl. .................................. 219/543; 219/553; 338/308; 250/493.1
[58] Field of Search ............... 219/528, 354, 543, 553, 219/538, 411; 338/308, 309; 250/492.1, 493.1, 495.1, 504

[56] References Cited

U.S. PATENT DOCUMENTS 3,875,413 4/1975 Bridgham ...................... 219/354 X
4,129,848 12/1978 Frank et al. ...................... 338/308
4,378,489 3/1983 Chabinsky et al. ................. 219/543

Primary Examiner—L. T. Hix
Assistant Examiner—Douglas S. Lee
Attorney, Agent, or Firm—McGlew and Tuttle

[57] ABSTRACT

A radiation source for infrared radiation includes an area radiator and a resistance layer which are arranged on a support substrate. The heat capacity of the radiation source is to be reduced to the extent that a modulation of the intensity of the radiation source with sufficiently high frequencies is made possible. To this end it is provided that the resistance layer is disposed in a thinned region of the support substrate.

10 Claims, 2 Drawing Figures

INFRARED RADIATOR

FIELD AND BACKGROUND OF THE INVENTION

This invention relates in general to radiation devices and in particular to a new and useful radiation source for infrared radiation.

The invention relates particularly to a radiation source for infrared radiation with an area radiator which is applied on a support substrate, and with an electrically conductive resistance layer which is applied as heating element on the support substrate.

From U.S. Pat. No. 3,875,413 and infrared radiator is known where the radiation source is formed as a thin film on a support. The film is used as a radiator directly as a heating resistance. The support consists of a material of low thermal conductivity, such as quartz or sapphire. In the central region of the support 11 an area type radiation source 13 is arranged, which is vaporized with a material of high electric resistance and high optical emission capacity and forms the heating resistor. It is at the same time the radiation source. The end pieces of the vaporized radiation source, contiguous in longitudinal directions are covered with contact electrodes of platinum which carry the terminal wires and cover the edges of the heating resistor. Due to the low emission capacity of platinum, the contact electrodes do not contribute to the radiation; the radiation is limited to the area of the heating resistor.

An important area of use of such infrared radiation sources is in gas analyzers, which, utilizing the infrared absorption, are able to distinguish and to measure the various components of a gas mixture to be analyzed.

In optical gas analysis, a modulated beam is employed, to permit a simple separation of the modulated wanted signal from the low-frequency random noise. If continuously luminous radiation sources are used, the radiation must be modulated by a mechanical chopper, such as a rotating mirror or rotating diaphragms. Such mechanical solutions are expensive and must be matched exactly, and because of their delicate construction they are not suitable for portable gas analyzers. The desideratum therefore is to realize the modulation of the optical beam by direct modulation of the radiation source intensity. An essential prerequisite for this is, however, that the radiation source must have as low as possible a heat capacity and that the heat removal to the surroundings takes place quickly.

The known infrared radiation sources in the form of thin metal layers on ceramic substrates have too high a heat capacity to permit a sufficiently high modulation frequency of the radiation source itself. While the known radiator needs little energy for heating because of its small total mass and the low thermal conductivity of the support, it is not suitable for radiation modulation by pulsed heating, for example, because during the heating intervals the heat is removed slowly from the radiation zone. Modulation of the radiation therefore requires an additional mechanical modulator disposed in the ray path afterwards.

SUMMARY OF THE INVENTION

The present invention provides an improved radiation source for infrared radiation in such a way that the heat capacity of the radiation source is further reduced and the heat removal to its surroundings is increased.

In accordance with the invention the resistance layer is applied in a thinned region of the support substrate.

The design of an infrared radiator according to the invention has the advantage that the area radiator has so low a heat capacity that a rapid modulation of the radiation source can be achieved by variation of the heating power in the resistance layer. In particular, modulation frequencies in the order of 100 Hz are possible.

Advantageously the modulability of the radiator is increased still further if openings are disposed in the thinned region.

Appropriately the electric resistance layer is formed as a conductor track entwined in itself, for example a meandering one.

Thus the conductor track become in advantageous manner an area type radiation source, but the heating of the conductor track by the electrical current remains limited to a small space. The modulability is further improved in that the support substrate on which the conductor track is disposed comprises a material of high thermal conductivity. In a further development of the invention, such a material may be silicon. An appropriate arrangement of the substance emitting the infrared radiation includes applying the substance in the thinned region as an additional layer. Thereby a distinct separation between the heat source in the form of the conductor tracks and the radiation source in the form of the infrared active substance is given. As a consequence thereof, there is used for the heating of the emission substance only the electrically highly conductive conductor track, so that the selection of an infrared active substance can be made from the viewpoint of an optimum radiator without the need to also watch for optimum electrical conductivity of the same substance.

In accordance with the invention a radiation source for infrared radiation comprises a support substrate which has a thin wall portion and with an area radiator applied on the support substrate which includes an electrically conductive resistance layer forming a heating element which is applied on a thin wall portion of the support substrate.

An object of the invention is to provide an improved radiation source construction which uses an area radiator of an electrically conductive resistant layer applied on a substrate which has a central thin wall portion on which an electrically conductive resistance layer is formed.

A further object of the invention is to provide a radiation source which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
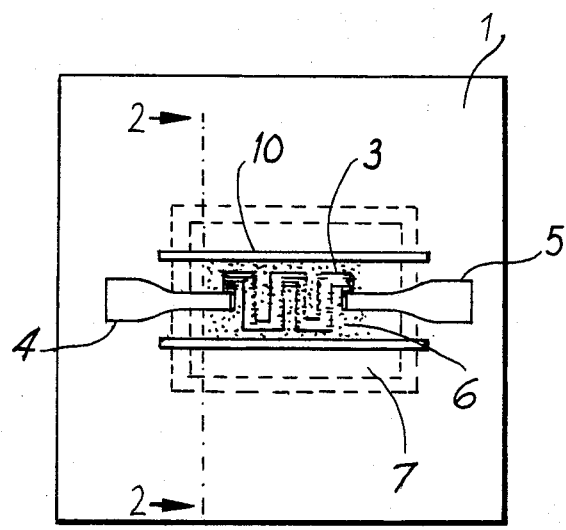
FIG. 1 is a plan view of an infrared radiation source according the invention.

Referring to the drawings in particular, the invention embodied therein comprises a radiation source for infrared radiation which includes a support substrate 1 which has a thin wall portion region 7 which forms a bridge upon which there is an insulating oxide layer 2 which is subsequently covered by a meandering conductor track 3 of platinum which is arranged to form an area radiator 6.

In FIG. 1 there is a plate-shaped support substrate 1 of silicon of a thickness of about 300 μm and coated on its top with an insulating oxide layer 2. On the layer 2 in the central field, there is the meandering conductor track 3 of platinum, applied by known methods, and arranged to form an area radiator 6. Track 3 is somewhat thickened at its ends to form the terminal contacts 4,5. They are connected to a pulsed current supply (not shown).

The conductor track 3 is covered with a substance 10 of silicon dioxide for the emission of the infrared radiation. Below the conductor track 3, in a region surrounding it, the support substrate is provided from the back with a thinned region or bridge 7 which has the form of a membrane of a thickness of about 20 μm. Bridge 7 is formed by a rectangular recess in the bottom surface of substrate 1, the bridge being co-planar with the top surface of substrate 1.

Figure 2:
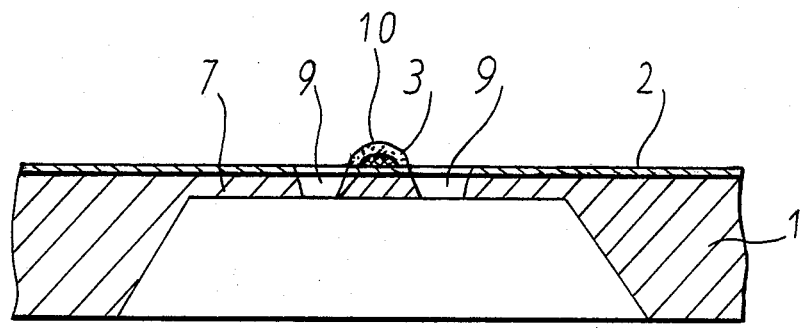
FIG. 2 is a sectional view along the line 2—2 through the radiation source.

The section in FIG. 2 shows in addition to the details already illustrated the openings 9 which are arranged in the thinned region 7 on either side of the conductor track 3. The conductor track 3 with its emission substance 10 is thus located on this thin bridge 7 which, when the heating current is turned on, quickly reaches the temperature required for radiation emission, at low power. If the heating current is cut off, the good thermal conduction of the support material causes in the bridge a rapid lowering of the temperature and reduction of the radiation. The thick edge regions of the support substrate 1 assure the mechanical sturdiness of the radiator.

While a specific embodiment of the invention has been shown and described in detail to illustrate the application of the principles of the invention, it will be understood that the invention may be embodied otherwise without departing from such principles.

What is claimed is:

1. A radiation source for infrared radiation comprising a support substrate made of material of high thermal conductivity and having top and bottom surfaces, said support substrate having a recess in at least one of said top and bottom surfaces forming a thin bridge region spanning said recess, an insulating layer on one of said top and bottom surfaces of said substrate, said insulating layer extending over said bridge region, and an electrically conductive track disposed on said insulating layer and extending over said bridge region, said track having opposite terminal contacts which are connectible to a source of pulsed current for heating said track to emit infrared radiation, said track being relatively easily heatable due to the relatively easily heatable thin bridge region compared to a remainder of said substrate.

2. A radiation source according to claim 1, wherein said thin bridge region includes openings therethrough on both sides of said electrically conductive resistant layer, said openings also passing through said insulating layer.

3. A radiation source according to claim 2, wherein said track extends from one end of said recess to an opposite end of said recess and over said bridge region, said openings extending from one end of said recess to an opposite end of said recess and on either side of said bridge region.

4. A radiation source according to claim 3, including a high emission capacity substance disposed over said track on said bridge region.

5. A radiation source according to claim 4, wherein said track comprises a meandering track meandering across said thin bridge region between said terminal contacts.

6. A radiation source according to claim 5, wherein said substrate comprises silicon, said insulating layer comprising an oxide and said high emission capacity substance comprising silicon dioxide.

7. A radiation source according to claim 6, wherein said electrically conductive track comprises platinum.

8. A radiation source according to claim 1, wherein said thin bridge region has a top surface coplanar with said top surface of said substrate, said recess being defined in said bottom surface of said substrate, said insulating layer being formed on said top surface of said bridge region and substrate.

9. A radiation source according to claim 8, including a high emission capacity substance over said track extending across said bridge region.

10. A radiation source according to claim 9, including openings on opposite sides of said track, said openings extending through said insulating layer and said thin bridge region and extending across said thin bridge region whereby said thin bridge region between said openings is easily heated when current is passed through said track, heat of said bridge region being rapidly dissipated through a remainder of said substrate when the current is stopped.

* * * * *